(12) United States Patent
Li

(10) Patent No.: US 10,845,630 B2
(45) Date of Patent: Nov. 24, 2020

(54) ELECTRONIC DEVICE HAVING OPTICAL SENSOR CIRCUIT ON ACTIVE DISPLAY AREA WITH MODIFIED LIGHT GUIDE

(71) Applicant: BEIJING XIAOMI MOBILE SOFTWARE CO., LTD., Beijing (CN)

(72) Inventor: Yanyong Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/569,356

(22) Filed: Sep. 12, 2019

(65) Prior Publication Data

US 2020/0098308 A1  Mar. 26, 2020

(30) Foreign Application Priority Data

Sep. 21, 2018  (CN) .......................... 2018 1 1109288

(51) Int. Cl.
*G02F 1/133* (2006.01)
*G02F 1/1335* (2006.01)
(Continued)

(52) U.S. Cl.
CPC ........ *G02F 1/13318* (2013.01); *G02F 1/1333* (2013.01); *G02F 1/133514* (2013.01); *G02F 1/134336* (2013.01); *G09G 3/3208* (2013.01); *G09G 3/36* (2013.01); *G02B 6/0058* (2013.01); *G02F 2001/13312* (2013.01);
(Continued)

(58) Field of Classification Search
CPC ............... G02F 1/13318; G02F 1/1333; G02F 1/134336; G02F 1/133514; G02F 2001/13312; G02F 2001/133388; G02F 2001/133302; G02F 2201/56; G09G 3/3208; G09G 3/36; G09G 3/3225;
(Continued)

(56) References Cited

U.S. PATENT DOCUMENTS

| 2012/0258773 | A1 | 10/2012 | Alvarez Rivera |
| 2014/0340363 | A1* | 11/2014 | Ikeda ................... G06F 3/0412 345/175 |

(Continued)

FOREIGN PATENT DOCUMENTS

| EP | 3187923 A1 | 7/2017 |
| EP | 3422091 A1 | 1/2019 |

OTHER PUBLICATIONS

European Patent Office, Extended European Search Report Issued in Application No. 191982719, dated Jan. 2, 2020, Germany, 7 pages.

*Primary Examiner* — Darlene M Ritchie
(74) *Attorney, Agent, or Firm* — Arch & Lake LLP

(57) ABSTRACT

The present disclosure relates to an electronic device including a display screen, where an active area of the display screen includes a first display area and a second display area, and a first distribution density of controllable sub-areas in the first display area is lower than a second distribution density of the controllable sub-areas in the second display area; and an optical sensor circuit, where a projection of the optical sensor circuit on the active area of the display screen is located in the first display area, and optical sensor circuit realizes light emission to an external environment and light reception from the external environment through the first display area.

7 Claims, 3 Drawing Sheets

(51) Int. Cl.
  *G09G 3/3208* (2016.01)
  *G09G 3/36* (2006.01)
  *G02F 1/1333* (2006.01)
  *H04N 5/225* (2006.01)
  *G02F 1/1343* (2006.01)
  *F21V 8/00* (2006.01)

(52) U.S. Cl.
  CPC ............ *G02F 2001/133388* (2013.01); *H04N 5/2257* (2013.01)

(58) Field of Classification Search
  CPC ...... H04N 5/2257; G02B 6/0058; G09F 9/33; G06F 3/044; G06F 3/0412
  See application file for complete search history.

(56) References Cited

U.S. PATENT DOCUMENTS

| | | | |
|---|---|---|---|
| 2016/0116777 A1* | 4/2016 | Kubota | G02F 1/13318 250/206 |
| 2016/0320887 A1* | 11/2016 | Li | G06F 3/044 |
| 2017/0142360 A1* | 5/2017 | Goto | G02B 27/0172 |
| 2018/0113566 A1* | 4/2018 | Shigemori | G06F 3/04886 |
| 2019/0089880 A1* | 3/2019 | Murao | H04N 5/2257 |
| 2019/0258112 A1* | 8/2019 | Nagasaki | G02F 1/13 |
| 2019/0326366 A1* | 10/2019 | Fan | H01L 27/3244 |
| 2019/0373166 A1* | 12/2019 | Jia | H04N 5/2257 |
| 2020/0066809 A1* | 2/2020 | Liu | G09F 9/302 |
| 2020/0081570 A1* | 3/2020 | Suk | G06F 21/32 |
| 2020/0111401 A1* | 4/2020 | Zhao | G09G 3/2003 |

\* cited by examiner

ELECTRONIC DEVICE HAVING OPTICAL SENSOR CIRCUIT ON ACTIVE DISPLAY AREA WITH MODIFIED LIGHT GUIDE

CROSS REFERENCE TO RELATED APPLICATIONS

This application claims priority to Chinese Patent Application No. 2018111092880 filed on Sep. 21, 2018, the entire content of which is incorporated herein by reference.

TECHNICAL FIELD

The present disclosure relates to an electronic device.

BACKGROUND

An optical sensor circuit such as a camera module is assembled in an electronic device for implementing a corresponding extended function. The optical sensor circuit and a display screen generally are independent of each other, and the optical sensor circuit and the display screen are to be isolated from each other as much as possible to avoid mutual interference.

SUMMARY

In view of this, the present disclosure provides an electronic device. According to an aspect of the present disclosure, an electronic device is provided. The electronic device includes: a display screen and an optical sensor circuit. The active area of the display screen includes a first display area and a second display area, a first distribution density of controllable sub-areas in the first display area is lower than a second distribution density of controllable sub-areas in the second display area. A projection of the optical sensor circuit on the active area of the display screen is located in the first display area. The optical sensor circuit realizes light emission to an external environment and light reception from the external environment through the first display area.

It is to be noted that the above general description and the following detailed description are intended to be illustrative and explanatory, and are not to be construed to limit the present disclosure.

BRIEF DESCRIPTION OF DRAWINGS

The accompanying drawings, which are incorporated in and constitute a part of the present description, illustrate examples consistent with the present disclosure and serve to explain the principles of the present disclosure together with the description.

DETAILED DESCRIPTION

Exemplary embodiments will be described in detail herein, examples of which are illustrated in the accompanying drawings. When the following descriptions involve the drawings, like numerals in different drawings represent like or similar elements unless stated otherwise. The implementations described in the following exemplary embodiments do not represent all implementations consistent with the present disclosure. Instead, they are merely examples of devices and methods consistent with some aspects of the present disclosure as detailed in the appended claims.

The terms used in the present application are for the purpose of describing particular embodiments, and are not intended to limit the present disclosure. The singular forms "a", "said" and "the" are intended to include plural forms unless the context clearly indicates otherwise. It should also be understood that the term "and/or" as used herein refers to and encompasses any or all possible combinations of one or more of the associated listed items.

It should be understood that although the terms first, second, third, etc. may be used to describe various information in the disclosure, such information should not be limited to these terms. These terms are only used to distinguish the same type of information from each other. For example, the first information may also be referred to as the second information without departing from the scope of the present application. Similarly, the second information may also be referred to as the first information. Depending on the context, the word "if" as used herein may be interpreted as "when" or "while" or "in response to a determination."

Figure 1:
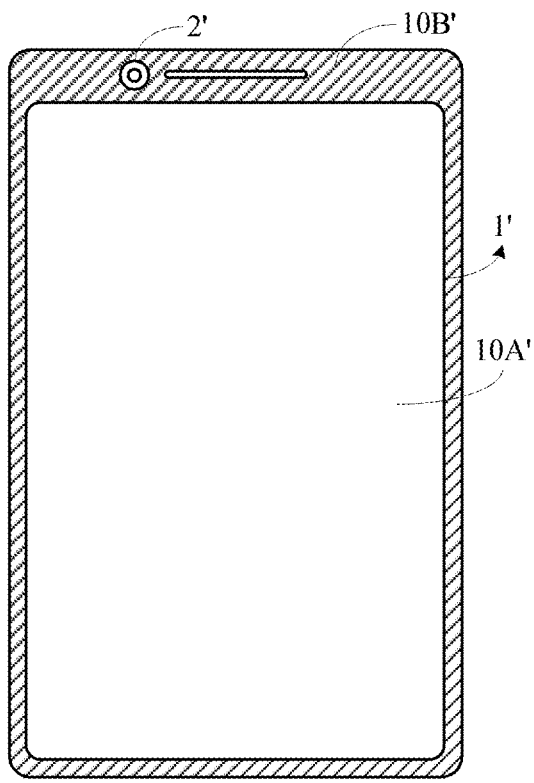
FIG. 1 is a schematic structural diagram of an electronic device in the related art.

FIG. 1 is a schematic structural diagram of an electronic device according to an aspect of the disclosure. An opening is drilled at a cover structure, and an optical sensor circuit is disposed in the opening to meet light emitting and receiving requirements of the optical sensor circuit. However, the opening will affect overall strength of the cover structure, and will also occupy valuable panel space, hindering a display screen from achieving a larger screen-to-body ratio.

As shown in FIG. 1, a panel side of the electronic device includes a first panel area 10A' and a second panel area 10B'. The first panel area 10A' is formed by the display screen 1' included in the electronic device, for example, the first panel area 10A' may be an active area of the display screen 1'. The second panel region 10B' is located outside the first panel region 10A' for shielding components, circuits, and the like inside the electronic device, and providing an installation space for the optical sensor circuit 2'.

The display screen 1' is completely separated from the optical sensor circuit 2'. Specifically, as shown in FIG. 1, an opening is drilled at the second panel region 10B', and the optical sensor circuit 2' is disposed in the opening. It can be seen that, since the optical sensor circuit 2' occupies some space of the second panel area 10B', the screen-to-body ratio, which is the ratio of the active area of the display screen 1' relative to area of the whole panel of the electronic device is hindered from further increasing when the size of the electronic device is unchanged.

Accordingly, the present disclosure achieves a greater screen-to-body ratio of electronic devices by making corresponding structural improvements to electronic devices.

Figure 2:
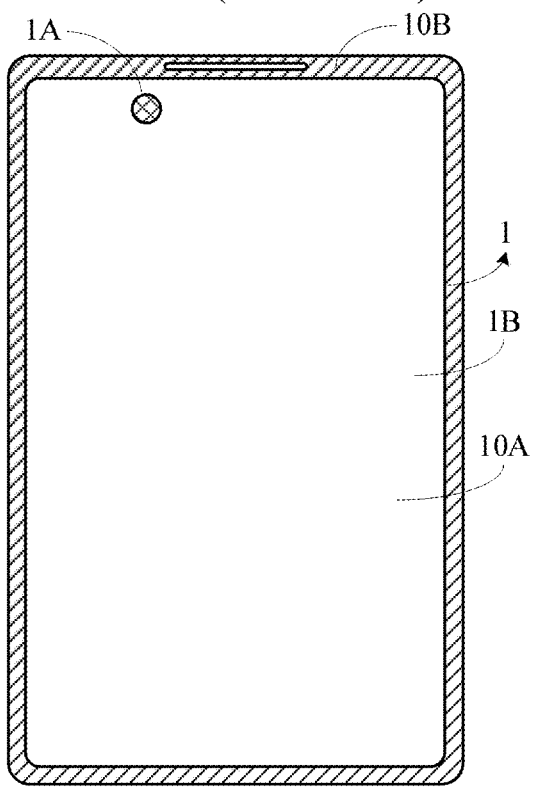
FIG. 2 is a schematic structural diagram of an electronic device according to an exemplary aspect.

FIG. 2 is a schematic structural diagram of an electronic device according to an aspect of the disclosure. As shown in FIG. 2, the electronic device includes a display screen 1 and an optical sensor circuit (not shown). Where, a panel side of the electronic device includes a first panel area 10A corresponding to the active area of the display screen 1 and a second panel area 10B located outside the first panel area 10A, and the active area 10A of the display screen is divided into a first display area 1A and a second display area 1B. Specifically, first distribution density of controllable sub-areas in the first display area 1A is lower than second distribution density of controllable sub-areas in the second display area 1B, so that the first display area 1A may realize at least a part of the display function, and allows the optical sensor circuit to transmit light to and receive light from the external environment through the first display area 1A.

By comparing the electronic devices shown in FIG. 1 and FIG. 2, it can be seen that when projection of the optical sensor circuit on the first panel region 10A is located at the first display region 1A, since installation space provided by the second panel region 10B' is not occupied, the corresponding space of the second panel area 10B' can be given to the display screen 1, so that the electronic device shown in FIG. 2 can achieve a larger screen-to-body ratio than FIG. 1.

In an example, the electronic device may include any electronic device having a display screen and an optical sensor circuit, such as a mobile phone, a tablet, a smart watch, a notebook computer, etc., and the disclosure is not limited thereto.

In an example, the optical sensor circuit may include any functional module that is configured to transmit light to and receive light from the external environment, such as one or more of a camera module, a light sensor module, a distance sensor module, and the like. The type and number of optical sensor circuits included in the electronic device are not limited in the disclosure.

In an example, the first display area 1A may be located at any position within the active area of the display screen 1, such as the middle or edge, the left or right part, the upper or the lower part of the active area, etc. The disclosure does not limit this.

In an example, the disclosure does not limit the shape, the specification, the number, and the like of the first display area 1A, which depend on shape and specification of the light receiving and emitting window (such as a light emitting and receiving area on lens of the camera module) of the corresponding optical sensor circuit and the number of the corresponding optical sensor circuits. For example, when the camera module is included in the electronic device, the first display area 1A may include a circular area shown in FIG. 2 which is equal to or slightly larger than the size of the camera lens.

In an example, the display screen 1 is an LCD (Liquid Crystal Display) display screen. The LCD type display screen 1 will be described below with reference to FIGS. 3 and 4.

Figure 3:
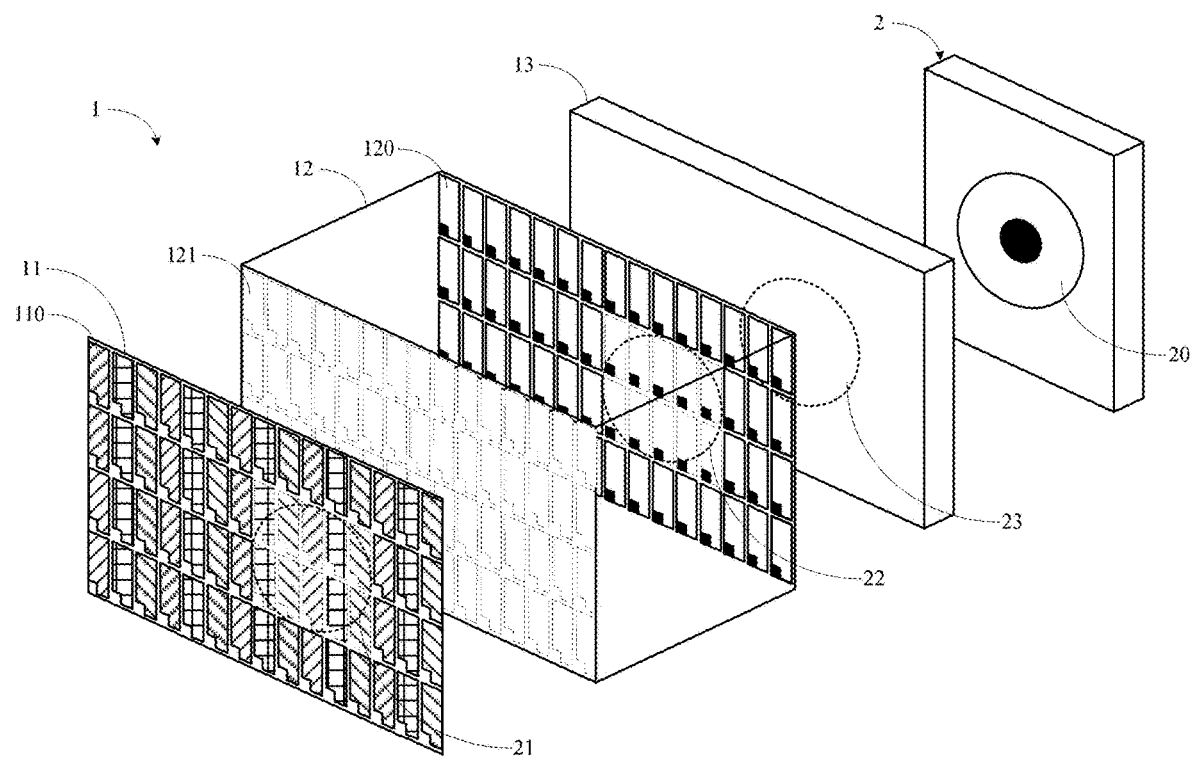
FIG. 3 is a schematic diagram showing a structural improvement of an LCD display screen according to an exemplary aspect.

FIG. 3 is a schematic diagram showing a structural improvement of an LCD display screen according to an aspect of the disclosure. As shown in FIG. 3, the display screen 1 may include a color filter 11, a liquid crystal layer 12, and a light guide plate 13, and these structures are sequentially stacked. The light guide plate 13 is printed with a pattern for guiding light emitted from the backlight to the liquid crystal layer 12. The liquid crystal layer 12 includes a plurality of driving circuits 120. The color filter 11 includes a plurality of sub-pixel regions 110. The driving circuits 120 are in one-to-one correspondence with the sub-pixel regions 110, so that whether to direct light to the corresponding sub-pixel regions can be controlled by the driving circuit 120, that is, the on-off, brightness, and the like of the corresponding sub-pixel regions 110 can be controlled. Since each sub-pixel region 110 on the color filter 11 can gate light of a corresponding color and filter out light of other colors, for example, the sub-pixel region 110 that gates red light can form a red sub-pixel, the sub-pixel region 110 that gates green light can form a green sub-pixel, and the sub-pixel region 110 that gates blue light may form a blue sub-pixel, so that pixels of various colors may be formed by combination of these sub-pixels.

The driving circuit 120 can control whether or not to emit light, mainly through the cooperation between the nematic liquid crystal filled inside the liquid crystal layer 12 and the polarizing plates. A first polarizing plate is disposed between the liquid crystal layer 12 and the light guide plate 13, and a second polarizing plate is disposed between the liquid crystal layer 12 and the color filter 11, and a polarization direction corresponding to the first polarizing plate and the second polarizing plate are both a. Assume that a light beam is guided by the light guide plate 13, then passes through the first polarizing plate and becomes polarized light parallel to the a direction, when the driving circuit 120 for controlling the liquid crystal molecules in the path of the polarized light is not energized, the corresponding liquid crystal molecules can change the polarized light to be parallel to the 13 direction, where the a direction and the 13 direction are perpendicular to each other, so that the polarized light will not pass through the second polarizing plate and reach and illuminate the corresponding sub-pixel region 110. If the driving circuit 120 is energized, the corresponding liquid crystal molecules will be deflected to be aligned in the a direction and will not change the direction of the polarized light, thus the polarized light will remain parallel to the a direction and smoothly pass through the second polarizing plate to reach and illuminate the corresponding sub-pixel region 110.

It can be seen that the liquid crystal layer 12 is divided into a plurality of liquid crystal sub-areas 121 corresponding one-to-one to the sub-pixel regions 110 and the driving circuits 120, and the driving circuits 120 may respectively control of energization and de-energization of the corresponding liquid crystal sub-areas, and thus control the corresponding sub-pixel area 110. In this way, the display screen 1 is divided into a plurality of controllable sub-areas 121 that are controlled independently of each other by the plurality of driving circuits 120. Therefore, before the improvement, as shown in FIG. 3, the distribution densities of the controllable sub-areas 121 in the first display region 1A and the second display region 1B are equal.

As shown in FIG. 3, according to the relative positional relationship between the display screen 1 and the optical sensor circuit 2, the lens 20 of the optical sensor circuit 2 corresponds to the filter region 21 in the color filter 11, the liquid crystal region 22 in the liquid crystal layer 12, and the light guiding region 23 in the light guide plate 13. In other words, the projections of the lens 20, the filter region 21, the liquid crystal region 22, and the light guiding region 23 on the first panel region 10A all correspond to the first display region 1A described above. In this case, the distribution density of the controllable sub-area 121 corresponding to the first display region 1A can be reduced by adjusting the driving circuits 120 in or partially in the liquid crystal region 22 on the liquid crystal layer 12.

Figure 4:
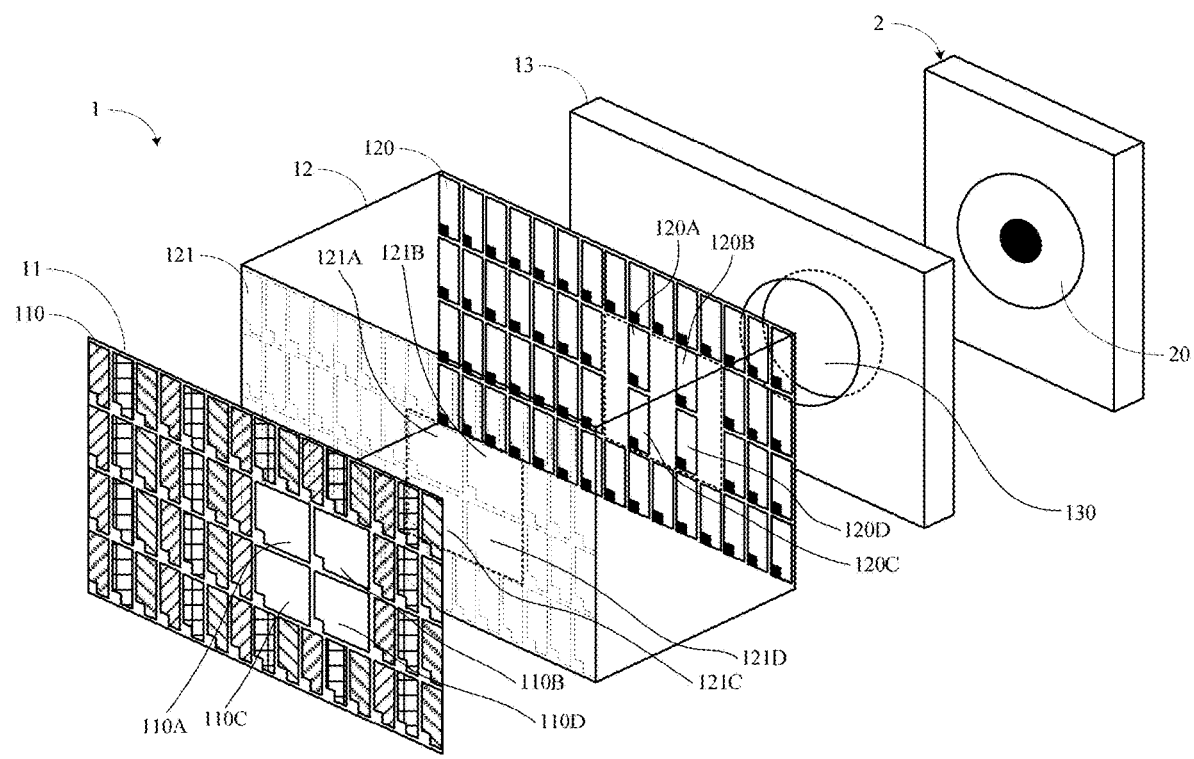
FIG. 4 is a schematic diagram showing a reduced density of a controllable sub-area according to an exemplary aspect.

For example, FIG. 4 is a schematic diagram showing a reduced density of controllable sub-areas according to one or more aspects of the disclosure. As shown in FIG. 4, the number of driving circuits 120 in the area 22 can be reduced, for example, from ten driving circuits 120 shown in FIG. 3 to four driving circuits 120A to 120D shown in FIG. 4; correspondingly, the ten controllable sub-areas 121 formed by the driving circuits 120 in FIG. 3 are reduced to the four controllable sub-areas 121A-121D formed by the driving circuits 120A-120D in FIG. 4. Since the number of controllable sub-areas 121 is reduced with the size of the occupied region (corresponding to the first display region 1A) constant, the distribution density of the controllable sub-areas 121 in the first display region 1A is reduced.

It can be seen that, in order to reduce the distribution density of the controllable sub-area 121 in the first display area 1A, the number of the driving circuits 120 in the first display area 1A can be reduced, so that a spacing between the driving circuits 120A-120D in the first display area 1A is greater than a spacing between the driving circuits 120 in the second display area 1B, thereby reducing occlusion effect of the first display area 1A on the optical sensor circuit 2 when emitting or receiving light, and effectively improving light transmittance of the first display area 1A.

In one or more examples, positions of the driving circuits 120 may also be changed while reducing the distribution density of the controllable sub-areas 121 within the first display area 1A. For example, when the first display area 1A is larger than or slightly larger than the light emitting and receiving window corresponding to the lens 20, the positions of the driving circuits 120 can be made to avoid the light emitting and receiving window. For example, the driving circuits 120 can be disposed at the edge of the first display area 1A as can as possible, thereby further reducing the occlusion of the optical sensor circuit 2 by the driving circuits 120, and effectively improving light transmittance.

In one or more examples, since the 10 sub-pixel regions 110 located in the filter region 21 on the color filter 11 shown in FIG. 3 are in the light emitting and receiving path of the optical module 2, therefore at least a portion of the sub-pixel regions 110 located in the filter region 21 (corresponding to the first display region 1A) may be removed, or at least a portion of the sub-pixel regions 110 located in the filter region 21 (corresponding to the first display region 1A) is absent.

For example, as shown in FIG. 4, assume that there are no sub-pixel regions 110 in the filter region 21, the light passing through the corresponding position does not form a colored sub-pixel, but appears as a single color; for example, when the light emitted by the backlight is white, white sub-pixels 110A to 110D as shown in FIG. 4 can be formed at the filter region 21 in accordance with the corresponding controllable sub-areas 121A to 121D. Of course, sizes of the white sub-pixels 110A-110D may be larger than the normal color sub-pixels, such that the resolution of the first display area 1A is lower than the resolution of the second display area 1B. Although the first display area 1A only achieves monochrome display and the resolution is relatively lower, at least a part of the display requirements can still be satisfied to some extent.

In one or more examples, since the light guiding structures in the light guiding area 23 of the light guiding plate 13 shown in FIG. 3 is in the light emitting and receiving path of the optical module 2, at least a portion of the light guiding structures in the light guiding area 23 (corresponding to the first display area 1A) may be removed, or at least a portion of the light guiding structures in the light guiding area 23 (corresponding to the first display area 1A) on the light guiding plate 13 is absent, to reduce or eliminate occlusion of light emitted from or to be received by the optical sensor circuit 2. For example, all of the light guiding structures on the light guiding plate 13 located in the light guiding region 23 are removed, and a through hole 130 as shown in FIG. 4 is formed. In this way, the lens 20 of the optical sensor circuit 2 can be placed in alignment with the through hole 130, or the lens 20 can be inserted into the through hole 130 to reduce the space occupation in the thickness direction of the electronic device.

In one or more examples, the display screen 1 includes an OLED (Organic Light-Emitting Diode) display screen. The OLED type display screen 1 will be described below with reference to FIG. 5.

Figure 5:
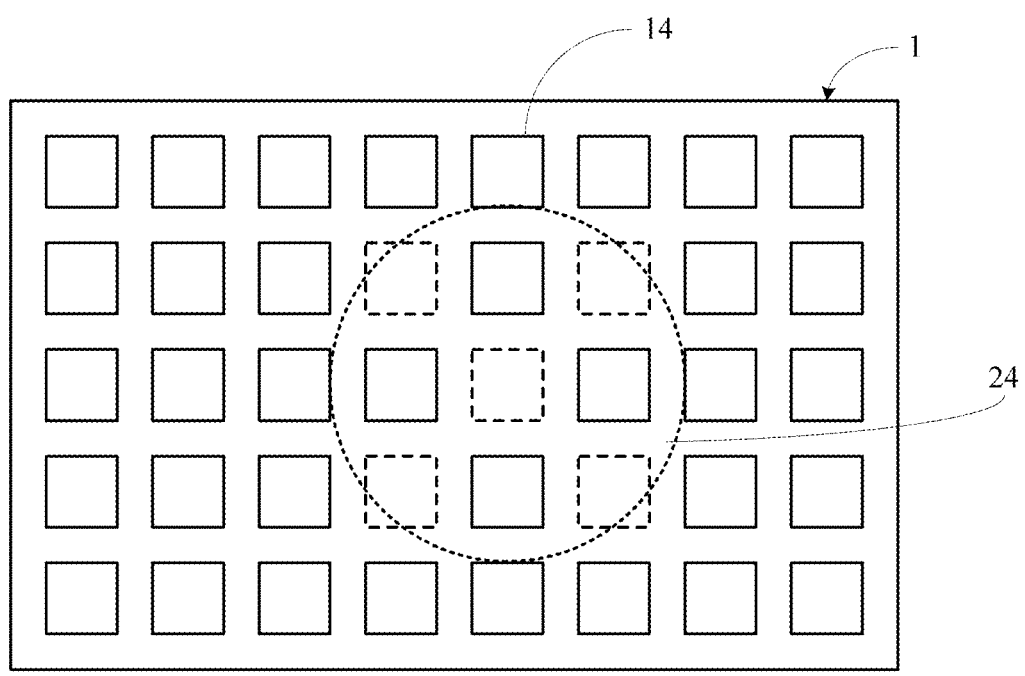
FIG. 5 is a schematic diagram showing structural improvements of an OLED display screen according to an exemplary aspect.

FIG. 5 is a schematic diagram showing structural improvements of an OLED display screen according to an aspect of the disclosure. As shown in FIG. 5, the OLED type display screen 1 includes a plurality of sub-pixel structures 14 that self-illuminate after being energized to form sub-pixels of corresponding colors. Therefore, each sub-pixel structure 14 corresponds to a controllable sub-area on the display screen 1 described with reference to FIGS. 3 and 4, that is, the density adjustment for the controllable sub-areas is actually density adjustment for the sub-pixel structures 14.

It is assumed that there is a region 24 corresponding to the projection of the optical sensor circuit 2 on the display screen 1 (for example, the region 24 covers the projection of the optical sensor circuit 2 on the display screen 1), and the region 24 corresponds to the first display region 1A described above. Before the improvement, the display screen 1 is evenly arranged with a plurality of sub-pixel structures 14, that is, the distribution densities of the sub-pixel structures 14 inside and outside the region 24 are the same, for example, nine sub-pixel structures 14 can be provided in the region 24.

After the improvement according to the technical solution of the present disclosure, as shown in FIG. 5, the five sub-pixel structures 14 indicated by the dotted rectangular blocks can be removed, and the four sub-pixel structures 14 indicated as solid rectangular blocks are retained, thereby reducing the distribution density of the sub-pixel structures 14 in the region 24. This is equivalent to reducing the distribution density of the sub-pixel structures 14 in the first display region 1A, that is, making the distribution density of the sub-pixel structures 14 in the first display region 1A lower than the distribution density of the sub-pixel structure 14 in the second display region 1B.

By reducing the distribution density of the sub-pixel structure 14 in the region 24, the occlusion caused by the region 24 to the optical sensor circuit 2 is reduced, thus effectively reducing the effect on light-emitting and light-receiving of the optical sensor circuit 2. At the same time, although the reduction in the number of sub-pixel structures 14 may result in a decrease in resolution at the first display area 1A, at least a part of the display requirements may still be satisfied by the remaining sub-pixel structures 14.

In summary, in the present disclosure, by adjusting the distribution density of the controllable sub-areas in the display screen, the first display area with a lower distribution density of the controllable sub-areas can achieve the display function while improving the light transmittance and satisfying the light-emitting and light-receiving requirements of the optical sensor circuit. The optical sensor circuit can be disposed at the first display area, thereby preventing the optical sensor circuit from occupying the display panel space of the electronic device so as to realize a larger screen-to-body ratio of the electronic device.

Other examples of the present disclosure will be readily apparent to those skilled in the art after reading the description and practicing the disclosure herein. The present application is intended to cover any variations, uses, or adaptations of the present disclosure, which are in accordance with the general principles of the disclosure and include common general knowledge or common technical means in the art that are not disclosed in the present disclosure. The specification and examples are to be regarded as illustrative only, and the true scope and spirit of the present disclosure are indicated by the appended claims.

It is to be understood that the present disclosure is not limited to the accurate structure described above and shown in the accompanying drawings and various modifications and changes may be made without departing from the scope of the present disclosure. The scope of the disclosure is to be limited only by the appended claims.

What is claimed is:

1. An electronic device, comprising:
    a liquid crystal display (LCD) screen, an active area of the display screen comprising a first display area and a second display area, wherein a first distribution density of controllable liquid crystal sub-areas in the first display area is lower than a second distribution density of controllable liquid crystal sub-areas in the second display area; and
    an optical sensor circuit, wherein a projection of the optical sensor circuit on the active area of the display screen is located in the first display area, and the optical sensor circuit realizes light emission to an external environment and light reception from the external environment through the first display area,
    wherein the controllable liquid crystal sub-areas in the first display area and the second display area located in a liquid crystal layer of the LCD display screen are respectively driven by a plurality of driving circuits with a one-to-one correspondence; and
    wherein the position of the plurality of driving circuits avoids a projection of a light emitting and receiving window of the optical sensor circuit on the liquid crystal layer.

2. The electronic device according to claim 1, wherein the liquid crystal layer of the LCD display screen includes a first liquid crystal area corresponding to the first display area and a second liquid crystal area corresponding to the second display area.

3. The electronic device according to claim 1, wherein the LCD display screen comprises a color filter, and at least a portion of the controllable liquid crystal sub-areas corresponding to the first display area on the color filter is absent.

4. The electronic device according to claim 1, wherein the LCD display screen comprises a light guiding plate, and
    at least a portion of the light guiding structures corresponding to the first display area on the light guiding plate is absent.

5. The electronic device according to claim 1, wherein the optical sensor circuit comprises at least one of the following hardware: a camera module, a light sensor, and a distance sensor.

6. The electronic device according to claim 1, wherein the display screen comprises an organic light-emitting diode (OLED) display screen.

7. The electronic device according to claim 6, wherein the controllable sub-areas comprise sub-pixel structures in the OLED display screen.

* * * * *